United States Patent
Kim et al.

(10) Patent No.: US 11,386,579 B2
(45) Date of Patent: Jul. 12, 2022

(54) CONTEXT-AWARE REAL-TIME SPATIAL INTELLIGENCE PROVISION SYSTEM AND METHOD USING CONVERTED THREE-DIMENSIONAL OBJECTS COORDINATES FROM A SINGLE VIDEO SOURCE OF A SURVEILLANCE CAMERA

(71) Applicant: CORNERS CO., LTD., Seoul (KR)

(72) Inventors: Tony Kim, Seoul (KR); James Choi, Seoul (KR); Seung Sik Yoon, Seoul (KR); Ji Han Kim, Bucheon-si (KR)

(73) Assignee: CORNERS CO., LTD., Seoul (KR)

( * ) Notice: Subject to any disclaimer, the term of this patent is extended or adjusted under 35 U.S.C. 154(b) by 20 days.

(21) Appl. No.: 17/124,786

(22) Filed: Dec. 17, 2020

(65) Prior Publication Data

US 2022/0189058 A1 Jun. 16, 2022

(30) Foreign Application Priority Data

Dec. 10, 2020 (KR) .................. 10-2020-0172580

(51) Int. Cl.
*G06T 7/73* (2017.01)
*H04W 4/029* (2018.01)
*G06V 40/20* (2022.01)
*G06V 40/10* (2022.01)

(52) U.S. Cl.
CPC .............. *G06T 7/74* (2017.01); *G06V 40/103* (2022.01); *G06V 40/25* (2022.01); *G06V 40/28* (2022.01); *H04W 4/029* (2018.02)

(58) Field of Classification Search
CPC ........... G06T 2207/10028; G06T 17/05; G06T 2219/2004; G06T 7/70; G06T 2210/61; G06T 7/74; G06V 20/52; G06V 40/103; G06V 10/245; G06V 40/20; G06V 40/15; G06V 40/10; G06V 40/25; G06V 40/28; H04W 4/029

See application file for complete search history.

(56) References Cited

U.S. PATENT DOCUMENTS

| | | | |
|---|---|---|---|
| 2018/0018508 A1* | 1/2018 | Tusch | G06V 40/20 |
| 2019/0122435 A1* | 4/2019 | Prideaux-Ghee | G06T 15/20 |
| 2021/0319229 A1* | 10/2021 | Subramanian | G06T 7/50 |
| 2021/0357649 A1* | 11/2021 | Adam | G06V 20/53 |
| 2021/0390840 A1* | 12/2021 | Rejal | G06V 20/13 |
| 2021/0398691 A1* | 12/2021 | Dhamija | G16H 50/80 |

(Continued)

OTHER PUBLICATIONS

A Comprehensive Survey of Enabling and Emerging Technologies for Social Distancing—Part II: Emerging Technologies and Open Issues (Year: 2020).*

(Continued)

*Primary Examiner* — Nizar N Sivji
(74) *Attorney, Agent, or Firm* — NSIP Law

(57) ABSTRACT

Disclosed is a context-aware real-time spatial intelligence provision system that estimates the locations of persons or things captured in a video by extracting objects representative of the persons and the things from the video captured by viewing a real space and placing the extracted objects in a virtual space to which a digital twin technique is applied. The disclosed context-aware real-time spatial intelligence provision system allows people to keep the distance between each other indoors, thereby preventing the spread of an infectious disease such as COVID-19.

15 Claims, 15 Drawing Sheets

(56) References Cited

U.S. PATENT DOCUMENTS

2022/0005610 A1* 1/2022 Ehrlich ................ G16H 50/30
2022/0011269 A1* 1/2022 Zhang ................ G01N 29/0618

OTHER PUBLICATIONS

Reconstruction of Smart Learning Space Based on Digital Twin Technology (Year: 2020).*
A Survey on Digital Twin: Definitions, Characteristics, Applications, and Design Implications (Year: 2020).*
How Tech-Enabled Smart Cities are Helping Fight Covid19 (Year: 2020).*

* cited by examiner (a)          (b)

(a)

(b)

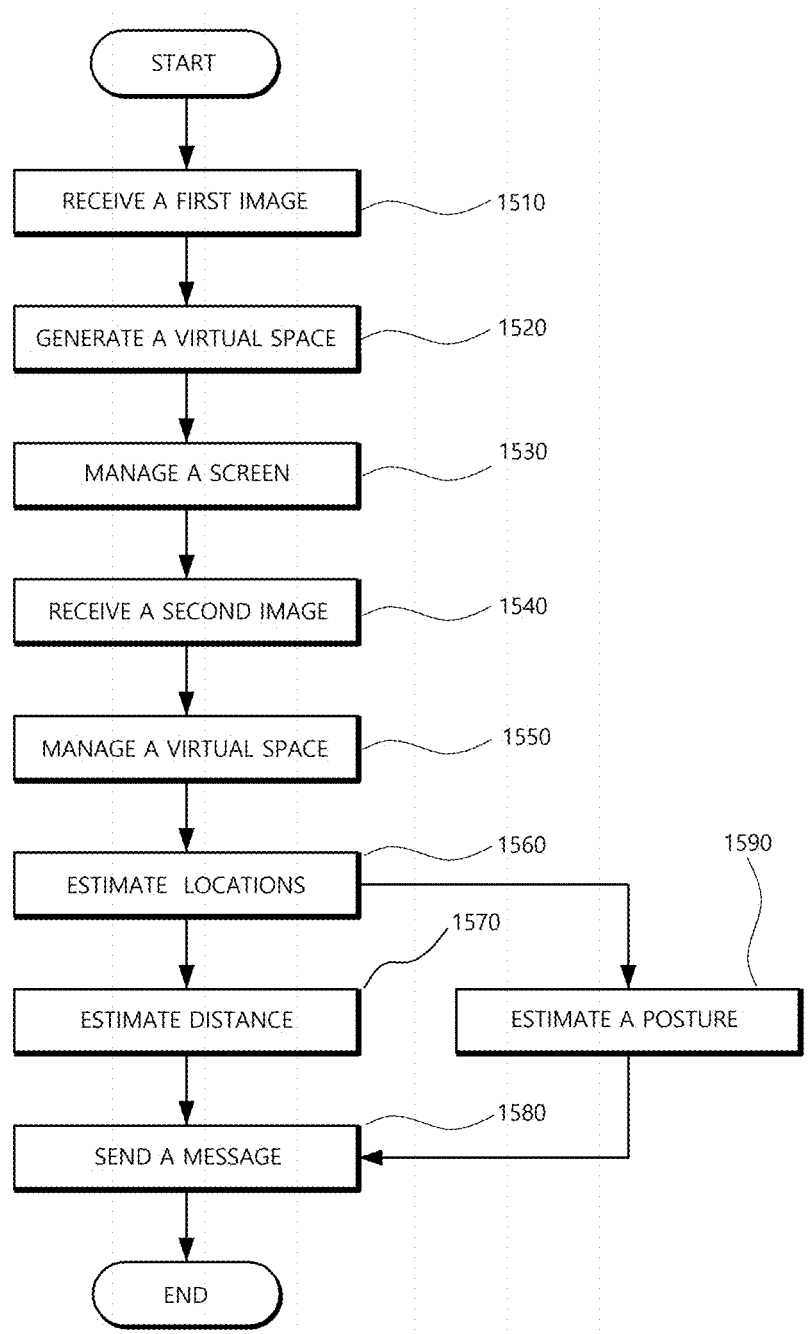

CONTEXT-AWARE REAL-TIME SPATIAL INTELLIGENCE PROVISION SYSTEM AND METHOD USING CONVERTED THREE-DIMENSIONAL OBJECTS COORDINATES FROM A SINGLE VIDEO SOURCE OF A SURVEILLANCE CAMERA

CROSS-REFERENCE TO RELATED APPLICATION

This application claims under 35 U.S.C. § 119(a) the benefit of Korean Patent Application No. 10-2020-0172580 filed on Dec. 10, 2020 which is incorporated herein by reference.

TECHNICAL FIELD

The following embodiments relate generally to an apparatus and method for estimating the locations of persons or the distance between persons or specific posture change of persons using a single surveillance camera, and more particularly to an apparatus and method for estimating the locations of persons or the distance between persons or specific posture change of persons using a digital twin model that converts 2D object coordinates extracted from a single source of live video stream into 3D coordinates.

BACKGROUND ART

Pandemic COVID-19 seriously threatens the health of people worldwide. Social distancing can be one of effective ways to keep such an infectious disease from spreading out. Social distancing should be applied for people in waiting lines or in groups inside of a building.

However, unless someone monitors and tells people about their social distancing violation, it is not easy for people to self-regulate their distancing from each other. Even when security personnel detects and directly tells people about their social distancing violations, this can cause many disputes and violent situations among them, which implies indirect detection and notification methods can be considered as one of more effective and frictionless alternatives.

Among many technical means for this purpose, prevalent video surveillance cameras combined with intelligent video analysis techniques can be regarded as a promising solution. However, previously known approach for detecting and calculating locations or distances for each object appears in video requires multiple video streams which capture same location with different angles of view. This can cause excessive costs for installing a lot of cameras and storage devices as well as requires highly advanced video analytics algorithms.

SUMMARY OF THE DISCLOSURE

An object of the following embodiments is to calculate the distance between persons by using a single video stream from a surveillance camera.

An object of the following embodiments is to calculate the distance between persons and send a warning message to persons who committed a social distancing violation.

An object of the following embodiments is to help people keep social distancing and thus to prevent infectious diseases such as COVID-19 from spreading out.

The present invention is provided with a context-aware real-time spatial intelligence provision system and method which comprises: a video stream receiver unit for a surveillance camera; a video analytics unit to detect and extract 2D coordinates of persons in video; a 3D digital twin model management unit to keep virtually adjusted and synchronized camera's angle of view information which enables automatic conversion from 2D to 3D coordinates.

The context-aware real-time spatial intelligence provision system may further include a distance calculation unit configured to identify the distance between two persons using the 3D converted coordinates.

The context-aware real-time spatial intelligence provision system may further include a control message sending unit which is configured to, when the calculated distance falls within a predetermined distance, send an activation message via wired or wireless communication network to the nearest mass notification devices for delivering relevant warning messages.

The context-aware real-time spatial intelligence provision system may further include a human posture detection unit configured to monitor the posture change of persons based on converted 3D coordinates of body parts.

The posture detection unit may be further configured to monitor the posture change of persons by: estimating the upward locations of body parts in 3D space starting from a surface level foot coordinates; estimating the upward locations of body parts is to find out possible adjacent 3D coordinates starting from those of surface level foot; and estimating the possible adjacent 3D coordinates can be done by applying statistically collected and researched proportional length ratio of body parts.

This 2D to 3D coordinates conversion is made possible by synchronizing the angle of view between a real surveillance camera and a virtual camera within the digital twin model.

The angle of view from a virtual camera can be adjusted such that 2D coordinates of two specific virtual locations are identical to those corresponding real locations from a real camera view.

The context-aware real-time spatial intelligence provision system may further include an angle of view adjustment unit configured to rotate or zooming the virtual angle of view so that the first specific location is conformed to one that corresponds to the location from a real angle of view.

The angle of view adjustment unit may rotate the angle of view from a virtual camera once again so that the second specific location is also conformed to one that corresponds to the location from a real angle of view.

BRIEF DESCRIPTION OF THE DRAWINGS

The above and other objects, features and advantages of the present invention will be more clearly understood from the following detailed description taken in conjunction with the accompanying drawings, in which:

FIG. 15 is a flowchart illustrating a method of estimating the 3D coordinates of persons or calculating the distance between persons using a digital twin model in a stepwise manner.

DETAILED DESCRIPTION OF THE DISCLOSURE

Embodiments will be described in detail below with reference to the accompanying drawings.

Figure 1:
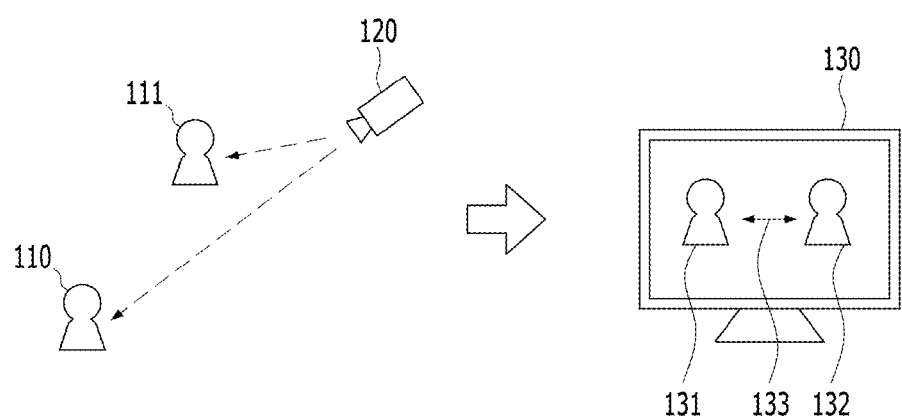
FIG. 1 is a diagram showing the concept of estimating the locations of persons or the distance between persons using a digital twin model.

FIG. 1 is a diagram showing the concept of estimating the locations of persons or the distance between persons using a digital twin model.

An area-of-interest may be monitored by installing a surveillance camera 120. When the camera 120 is installed far away from persons 110 and 111, the persons 110 and 111 appear as small size on the monitoring screen. The distance between the person 110 and 111 also appear very close. On the other hand, when the camera 120 is installed near to the persons 110 and 111, the persons 110 and 111 appear as relatively big size and the distance between them on the monitoring screen appear much distant than the former case—even though the distance has not changed at all.

This implies that only with the 2D coordinates extracted from the 130 video monitoring screen, it is difficult for a computer system to find out the actual locations of persons 131 and 132 or the actual distance 133 between the persons 131 and 132.

Otherwise, if there is a 3D virtual digital twin space model and an angle of view from a virtual camera 120 can be synchronized with an angle of view from a real camera 130, the 2D coordinates extracted from the 2D angle of 130 view screen can be converted into 3D coordinates within a virtual digital twin space model. As a result, converted 3D coordinates of persons 131 and 132 can be used by computer systems to identify or visualize locations of persons and to calculate a distance 133 between two persons.

Figure 2:
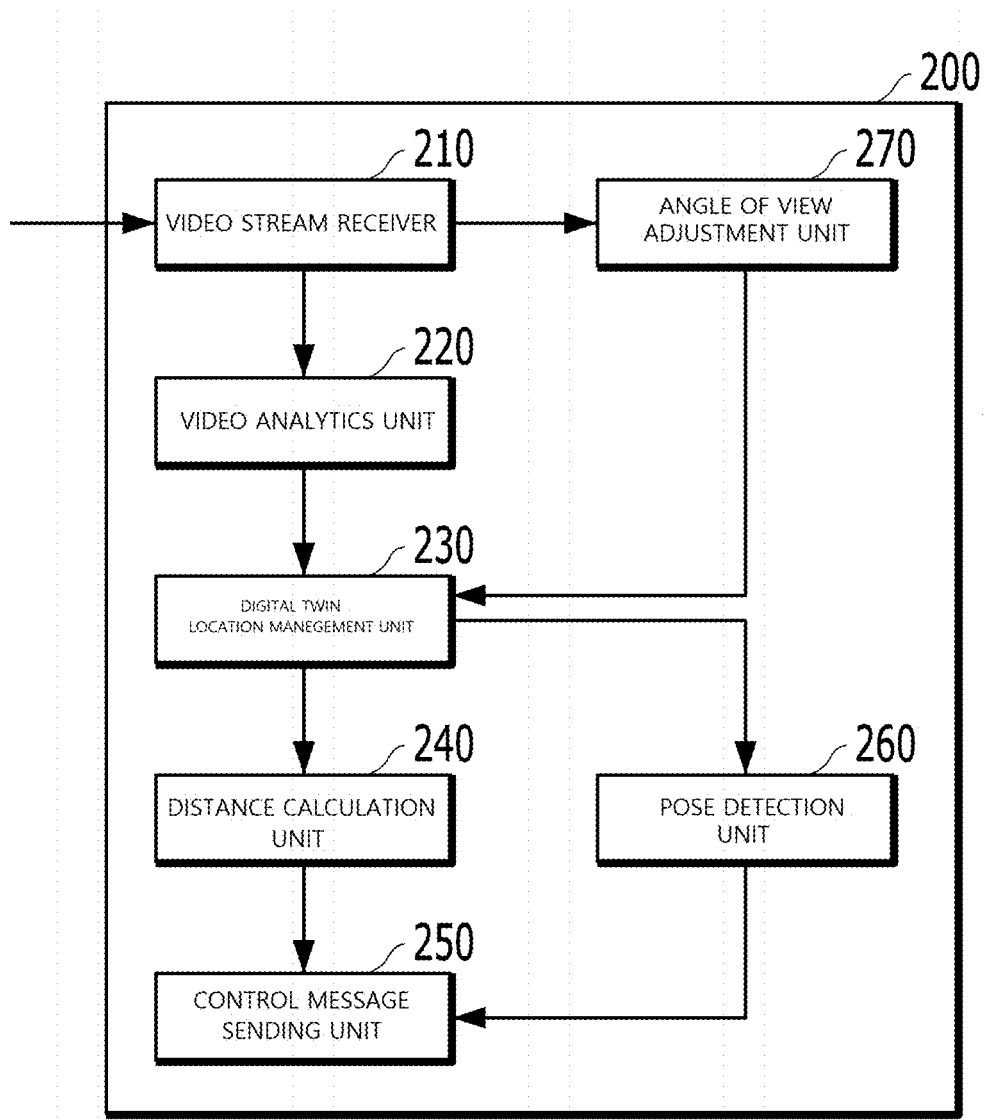
FIG. 2 is a block diagram showing the structure of a context-aware real-time spatial intelligence provision system and method according to an exemplary embodiment.

FIG. 2 is a block diagram showing the structure of a context-aware real-time spatial intelligence provision system and method according to an exemplary embodiment. The system according to the present embodiment may include a video stream receiver unit 210, a video analytics unit 220, a digital twin location management unit 230, a distance calculation unit 240, a control message sending unit 250, a posture detection unit 260, and an angle of view adjustment unit 270.

The video stream receiver unit 210 receives a live video stream captured by a surveillance camera that is installed at a specific location.

The video analytics unit 220 identifies persons within the video stream to extract 2D diagonal (x, y) coordinates of a rectangles around the detected persons in video.

The digital twin location management unit 230 visualizes locations of persons within a 3D virtual digital twin space model. The angle of view adjustment unit 270 makes it possible for unit 230 to convert 2D coordinates of persons into 3D coordinates which are referenced by a digital twin space model.

Figure 3:
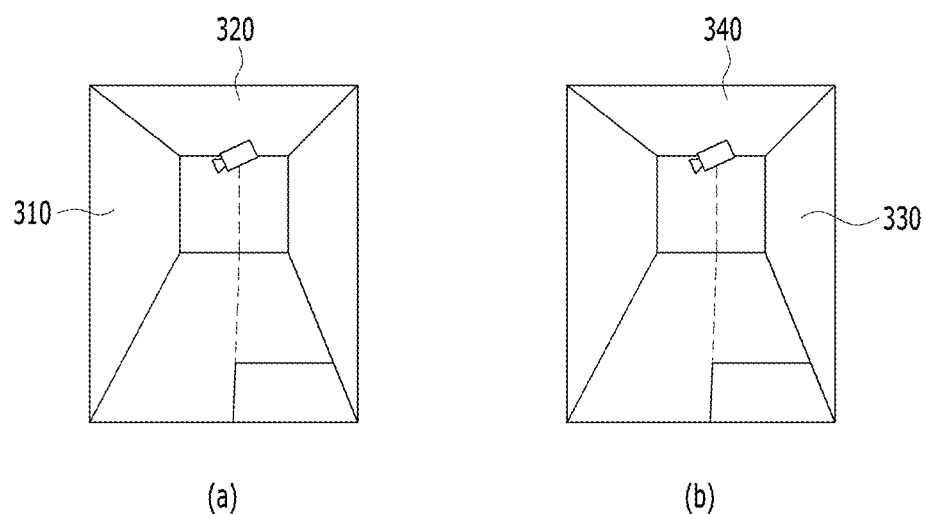
FIG. 3 is a diagram showing the concept of setting the location of a camera in a virtual digital twin space model.

FIG. 3 is a diagram showing the concept of setting the location of a camera in a 3D virtual digital twin space model.

The left side of FIG. 3 is a view of a real camera 320 installed in a real space 310, and the right side of FIG. 3 is a view of a virtual camera 340 installed in a virtual space 330. The exact location of the real camera 320 installation point can be found out by measuring on site.

The virtual location of a corresponding virtual camera 340 is used by the angle of view adjustment unit 270. An embodiment in which the angle of view adjustment unit 270 used for synchronizing the angle of view between the real camera 320 and the virtual camera 340 will be described with reference to FIGS. 4 to 7.

Figure 4:
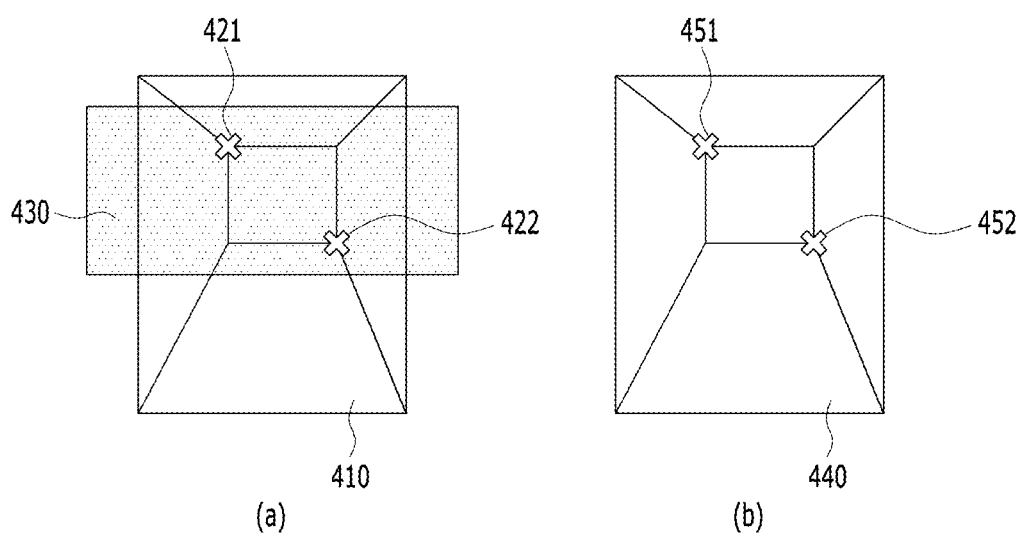
FIG. 4 is a diagram showing the concept of selecting two specific locations in a virtual digital twin space model.

FIG. 4 is a diagram showing the concept of synchronizing the angle of view between two cameras 320 and 340 by selecting two specific reference locations.

The left side of FIG. 4 shows a captured video screen 430 which is a part from a real space 410. Two reference locations may be selected among the corner points such as 421 and 422.

The angle of view adjustment unit 270 sets the two corresponding reference locations 451 and 452 from a virtual digital twin space model 440.

The angle of view adjustment unit 270 may rotate or zoom in/out the virtual camera 340 to adjust the angle of view in a virtual space 440 conforms to the angle of view 430 with respect to the two reference locations.

Figure 5:
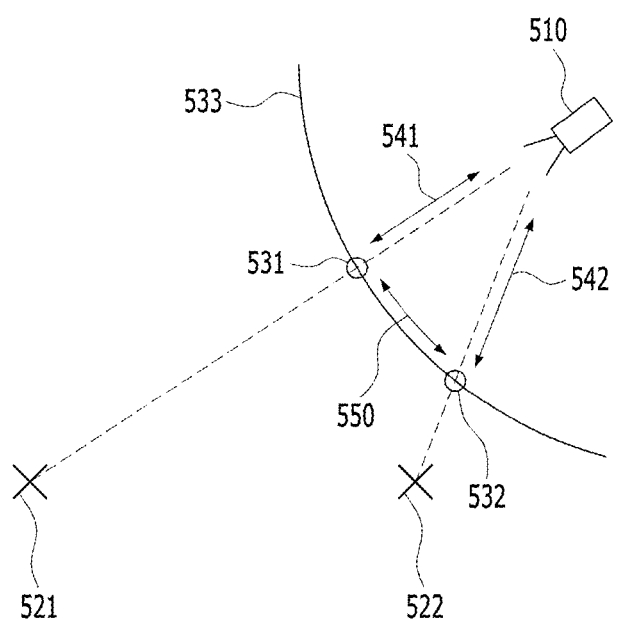
FIGS. 5 to 7 are diagrams showing the concept of synchronizing the angle of views between a real camera and a virtual camera in a digital twin space model.
Figure 6:
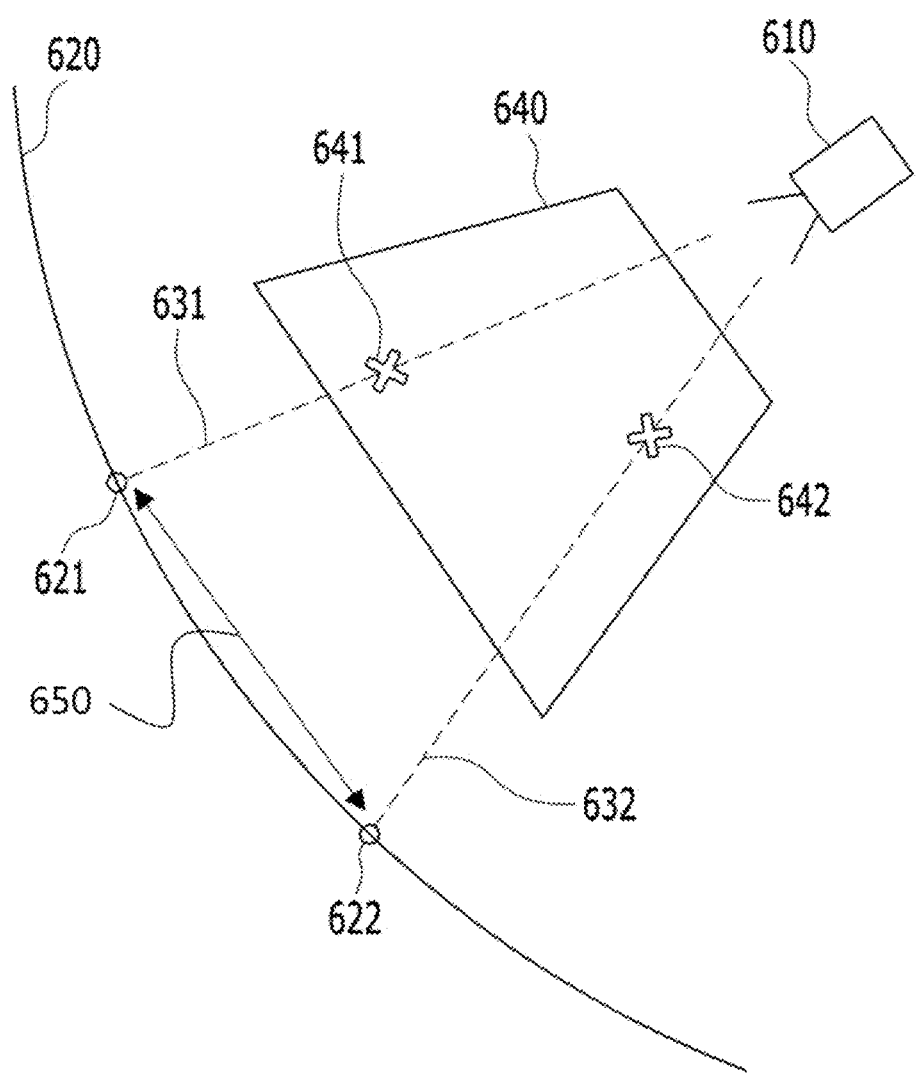
Figure 7:
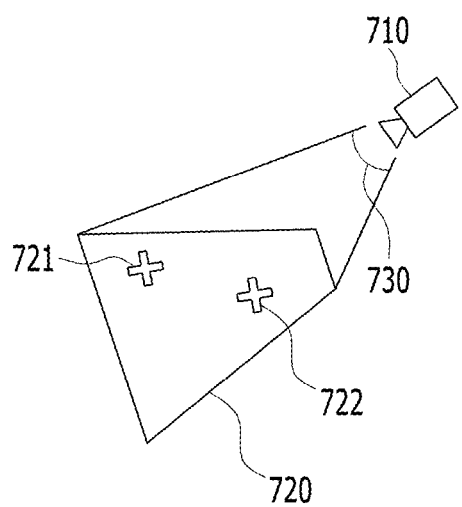
Figure 7:
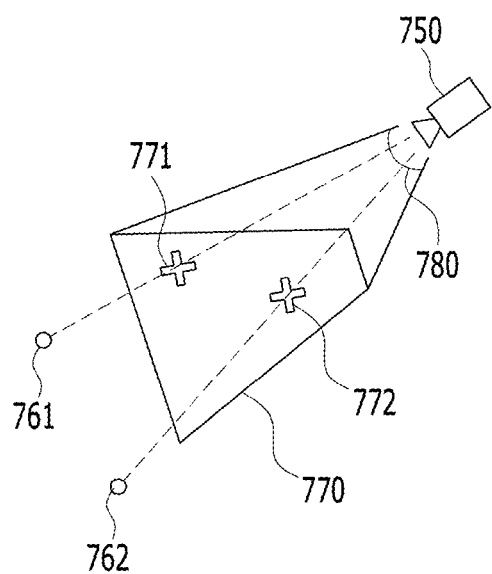

FIGS. 5 to 7 are diagrams showing the concept of adjusting the angle of view of a virtual camera, which results in creating a virtual 2D angle of view screen at somewhere in the middle between the virtual camera and the floor surface of a digital twin space model.

In FIG. 5, two virtual reference locations 521 and 522 are connected to a location of virtual camera 510 with two dotted lines. All points belong to the curved line 533 are at the same specific distance 541 and 542 from the location of a virtual camera 510. Distance 550 between Two intersection points 531 and 532 is calculated and will be used as a new reference for the angle of view adjustment.

In FIG. 6, a virtual 2D angle of view screen 640 is placed at somewhere in the middle between the virtual camera 610 and the floor surface (not shown here) of a digital twin space model. Two virtual reference locations 641 and 642 are shown onto the virtual screen 640 and two dotted lines 631 and 632 end with two intersection points 621 and 622 at the same distance 541 from the virtual camera 610. The distance 650 between 621 and 622 can be adjusted by changing the angle of view of a virtual camera 610 to conform to the distance 550.

In FIG. 7(*a*), the angle of view 730 of a virtual camera 710 determines the aspect of a virtual screen 720 and corresponding reference locations 721 and 722.

Referring to FIG. 7(b), changes in the angle of view 780 of a virtual camera 750 results in distance change between two reference locations 771 and 772 on the virtual screen 770 as well as distance change between 761 and 762 which are at a same distance 541 from the camera 750. The angle of view adjustment unit 270 is used to find out the angle of view of a virtual camera that make the distance between 761 and 762 identical to the distance 550.

Figure 8:
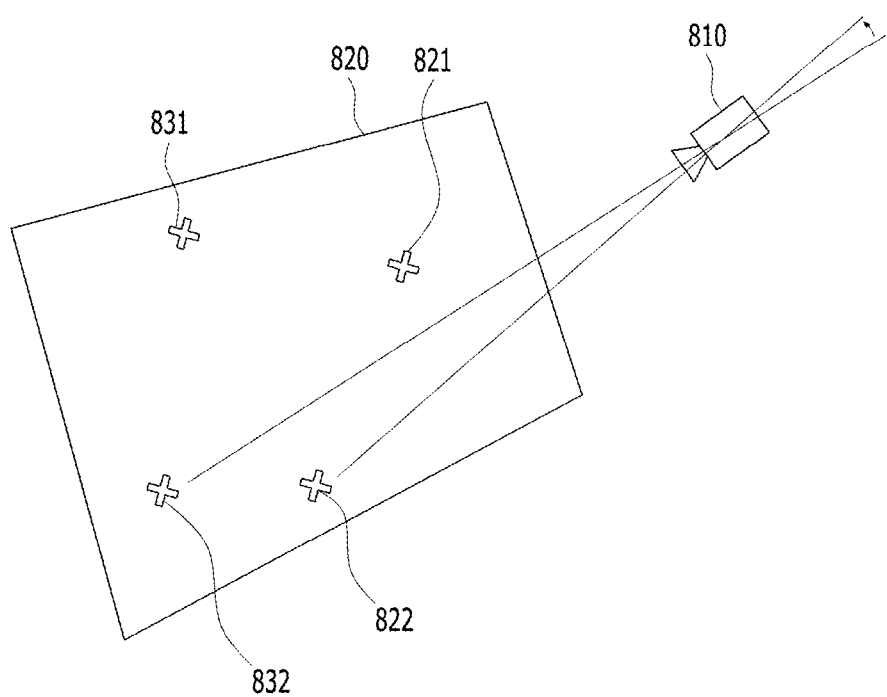
FIGS. 8 and 9 are diagrams showing the concept of synchronizing the angle of views by rotating or zooming a virtual camera in a digital twin space model to make two specific locations conform.
Figure 9:
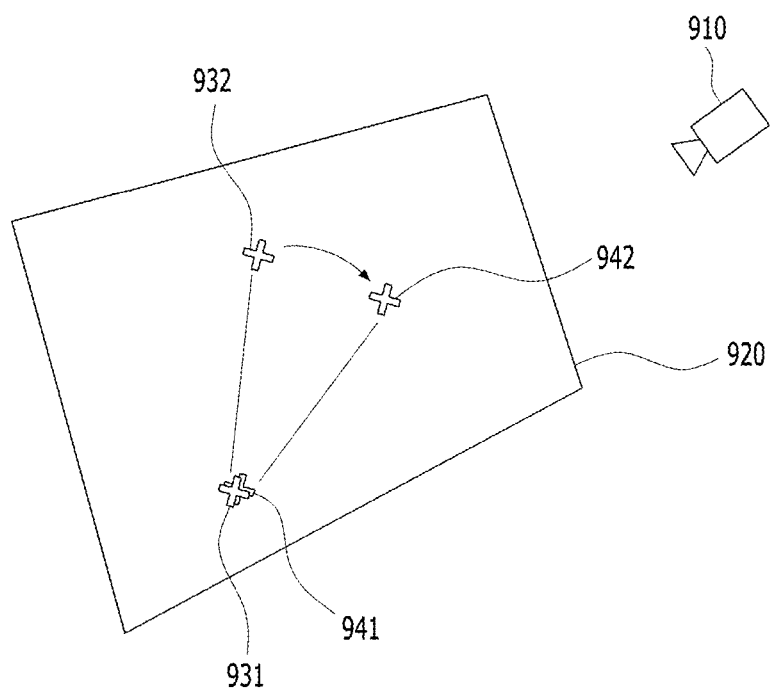

FIGS. 8 to 9 are diagrams showing the concept of tilting and rotating a virtual camera to finalize the angle of view adjustment.

In FIG. 8, the virtual screen 820 is dependent on the position of a virtual camera 810. If two virtual reference locations 831 and 832 are different from the original reference coordinates of locations 821 and 822 extracted from a real video screen, the virtual camera 810 can be adjusted first to move the whole virtual screen 820 with fixed mark for 821 and 822 to make 822 and 832 overlapped.

FIG. 9 shows the adjusted virtual screen 920 and the lower-left reference locations 931 and 941 are overlapped but the other the reference locations 932 and 942 are still not overlapped. As a final step of adjustment, rotate the whole virtual screen 920 clockwise to make 932 and 942 overlapped.

Figure 10:
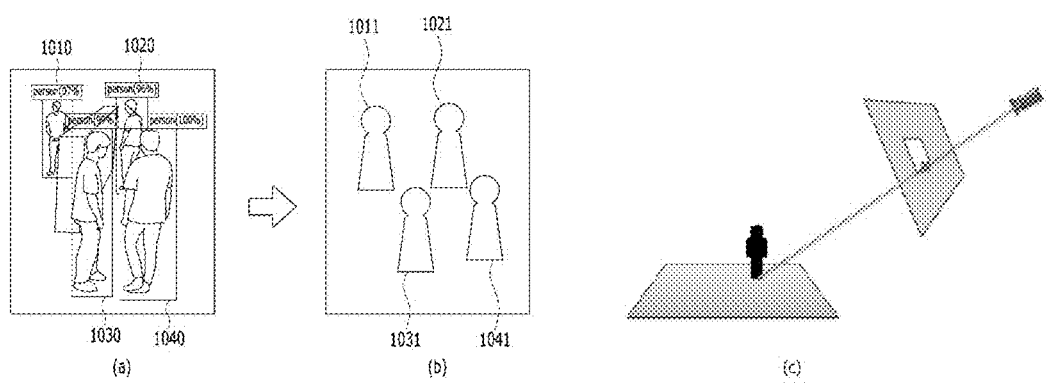
FIG. 10 is a diagram showing the concept of placing persons in a virtual digital twin space model by converting 2D coordinates from a virtual angle of view into 3D coordinates.

FIG. 10 is a diagram showing the concept of placing persons in a 3D virtual digital twin space model.

FIG. 10(a) shows a real video screen received and analyzed by the video stream receiver unit 210 and the video analytics unit 220. There are four persons 1010, 1020, 1030 and 1040 detected and 2D coordinates for each person are extracted and visualized as 1011, 1021, 1031, and 1041 on the virtual screen in FIG. 10(b). As shown in FIG. 10(c), the digital twin location management unit 230 creates virtual straight lines starting from the virtual camera, through the bottom centers of 1011, 1021, 1031 and 1041 ending at the surface level of a virtual digital twin space model. This process can be explained as a method for converting 2D coordinates in FIG. (b) into 3D coordinates in FIG. (c). The resulting 3D coordinates for a person can be acquired in real-time and used for visualizing, monitoring and tracking the location within the 3D virtual digital twin model.

Figure 11:
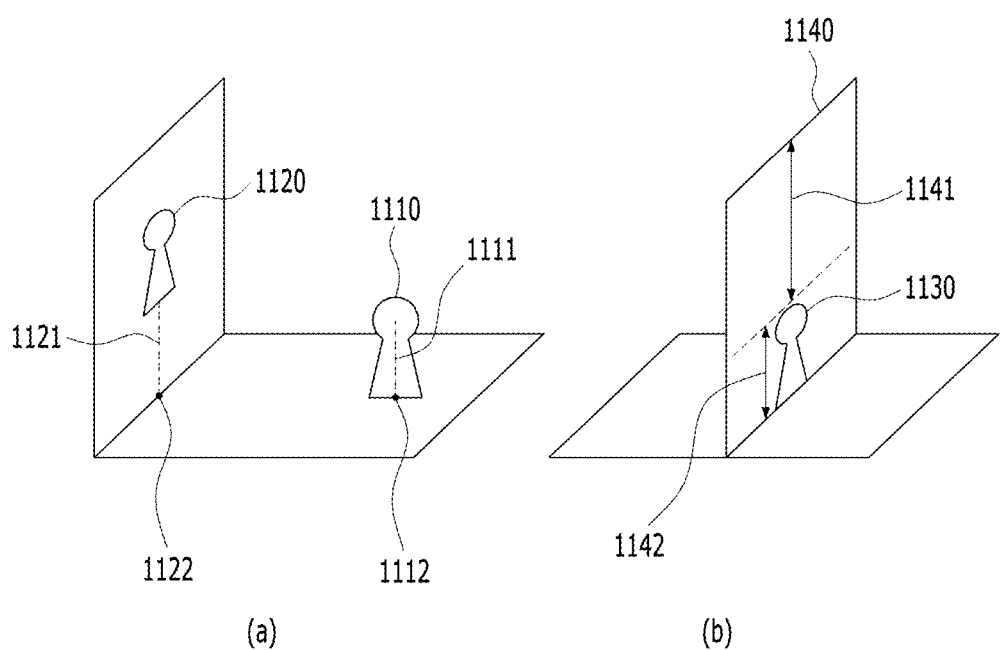
FIG. 11 is a diagram showing the concept of filtering out false detection—such as projected person image on a glass wall or abnormal height of a person caused by detection error—by applying converted 3D coordinates within a digital twin space model.

FIG. 11 is a diagram showing the concept of filtering out mirror reflected image of a person and other false detection cases, which is difficult to implement with video analytics approach only.

In FIG. 11(a), typical video analytics software might detect 1120 as a person, but 1120 is a reflected image of a person 1110 onto a standing mirror or a glass-type wall. The digital twin location management unit 230 knows a distance 1121 between the bottom end of 1120 and the surface level, which means 1120 is not a real person. On the other hand, 1110 can be confirmed as a real person—the bottom of center line 1111 meets with a point 1112 on the surface level.

FIG. 11(b) shows another advantage when using the digital twin location management unit 230. A virtual standing person 1130 is detected by the video analytics unit 220 and placed onto a digital twin model, but the distance 1141 from the head top of 1130 to the ceiling line 1140 can be too long or too short. On the other hand, the height of a standing person 1130 can be too high or too short. This type of fault detection method is only possible with the digital twin location management unit 230.

Figure 12:
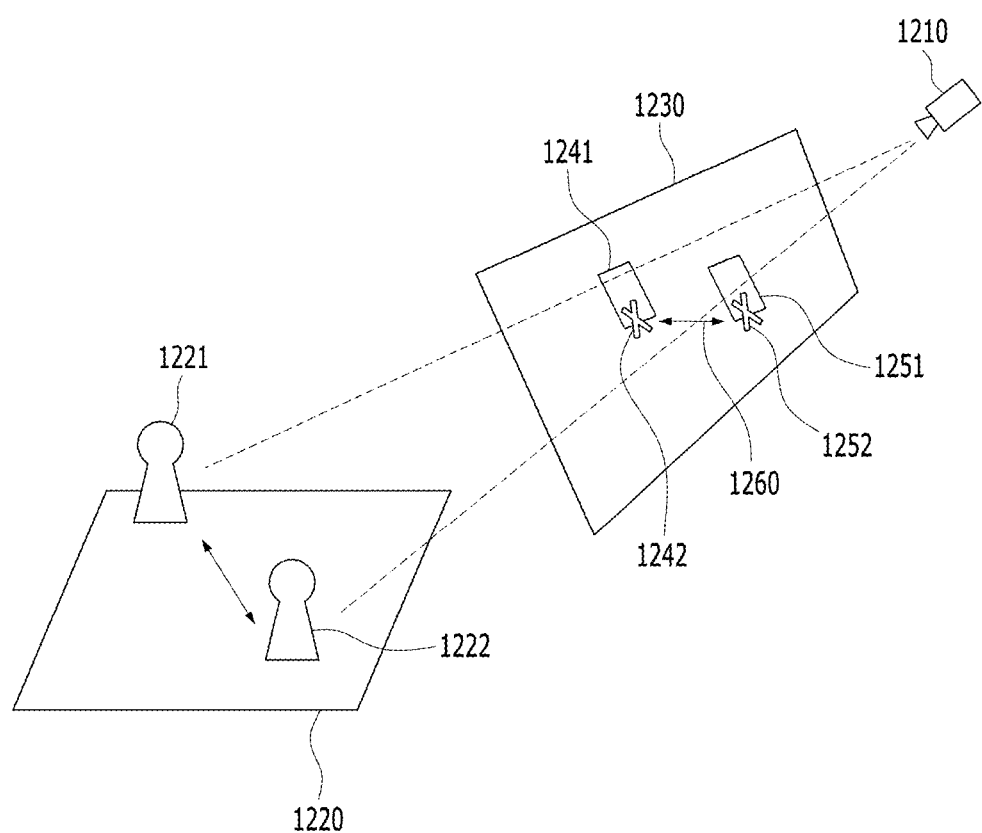
FIG. 12 is a diagram showing the concept of converting 2D coordinates into 3D coordinates to calculate the distance between persons in a virtual digital twin space model.

FIG. 12 is a diagram showing the concept of calculating the distance between persons 1221 and 1222 standing onto a virtual surface plane 1220 viewed by a virtual camera 1210 in a virtual digital twin space model. Once the digital twin location management unit 230 creates 3D coordinates for each person 1221 and 1222 based on a virtual video screen 1230 and 2D bottom center coordinates 1242 and 1252 extracted from detected persons 1241 and 1251, the distance calculation unit 240 can calculate a correct distance between 1221 and 1222, instead of calculating the wrong distance 1260.

According to one aspect, when the calculated distance between persons does not satisfy 6 feet social distancing, the control message sending unit 250 may remotely activate notification devices to deliver a warning message about their social distancing violation.

Figure 13:
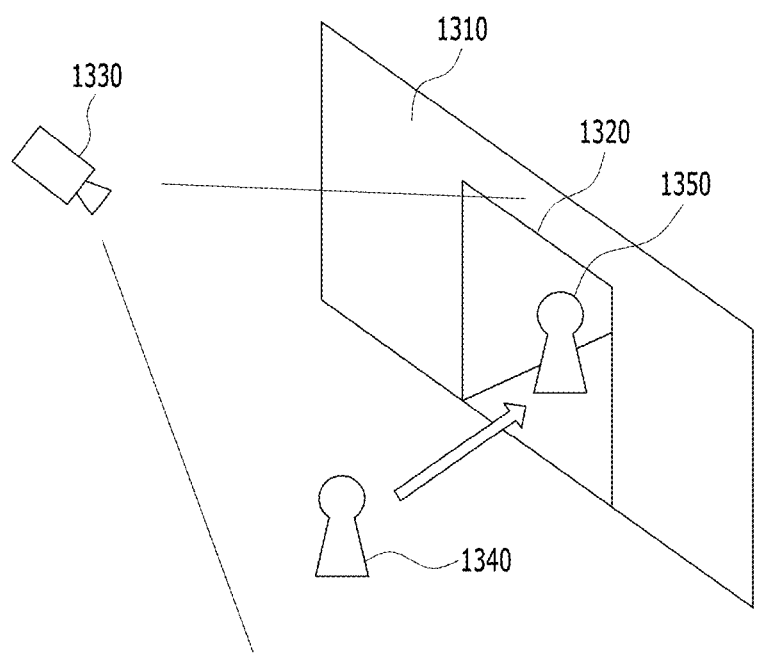
FIG. 13 is a diagram showing the concept of counting the number of persons in and out by tracking the 3D coordinates of persons within a digital twin space model.

FIG. 13 is a diagram showing the concept of counting the number of in and out persons with the digital twin location management unit 230. A digital twin space model comprises walls 1310 and doors 1320 which can be a reference to in and out counting situation. A real-time location tracking for a person 1340 captured by a camera 1330 can recognize the move in situation based on the changed location of the person 1350.

Figure 14:
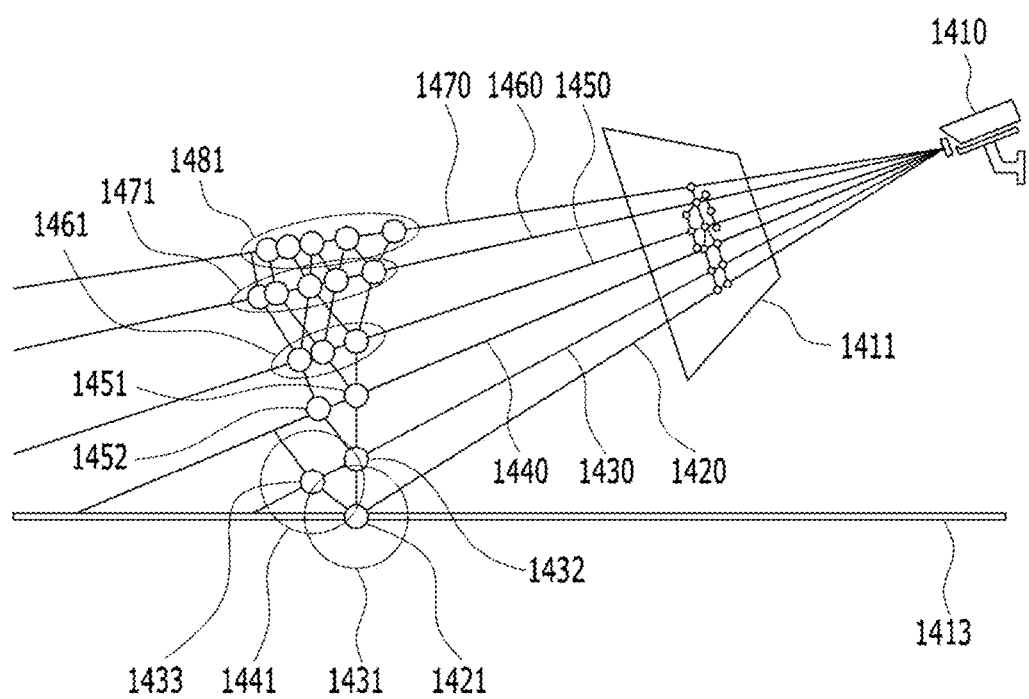
FIG. 14 is a diagram showing the concept of estimating the posture change—such as man-down situations—of a person by generating possible 3D coordinates of adjacent body parts starting from the coordinates of a surface level foot.

FIG. 14 is a diagram showing the concept of detecting the specific posture change of a person such as man-down situation.

The digital twin location management unit 230 may estimate 3D coordinates for each body part also.

The posture detection unit 260 may analyze a video screen 1411 captured from a camera 1410 to detect and extract 2D coordinates of various body parts such as foot ankle, knees, pelvis, wrist, shoulders, and head. These 2D coordinates can be used to create virtual lines 1420, 1430, 1440, 1450, 1460, and 1470 in the order of bottom-up from the foot to the head. The converted 3D coordinates of a foot 1421 may be a starting point and after a series of chain reaction type of estimation process, sets of 3D coordinates of a head can be used to determine the man-down situation.

The adjacent upward body part of a foot 1421 is a knee and there can be only two intersection points 1432 and 1433 on the line 1430—intersection with a circle 1431. The next adjacent upward body part from the knee is pelvis and there can be only two intersection points 1451 and 1452 on the line 1440. One of the knee coordinates 1433 is infeasible location as the adjacent pelvis cannot be located on the line 1440—the circle 1433 cannot intersect with line 1440. Likewise, there can be three locations 1461 for a next adjacent body part and five locations 1471 for a next one, and five locations for a final body part—head. After all of these calculations, it becomes apparent that this person is standing on the floor. If the resulting 3D location of a head can be shown onto the floor, there is quite high possibility for the man-down situation. All the adjacent distance between one body part and another need not be measured. The first adjacent distance from a foot and a knee will be enough to calculate other distances as there are statistically collected and researched proportional ratio data for human body parts.

FIG. 15 is a flowchart illustrating a method of estimating the locations of persons or the distance between persons using a digital twin model in a stepwise manner.

At step 1510, the context-aware real-time spatial intelligence provision system receives the first video stream from a real camera.

At step 1520, the context-aware real-time spatial intelligence provision system generates and manages a virtual digital twin space model.

According to one aspect, the context-aware real-time spatial intelligence provision system may determine the location of the virtual camera in the virtual space so that the location of the virtual camera is conformed to the location of the real camera.

At step 1530, the context-aware real-time spatial intelligence provision system may determine the angle of view of the virtual camera so that the angle of view of the virtual camera is conformed to the angle of view of the real camera.

At step 1530, the context-aware real-time spatial intelligence provision system may rotate a virtual screen captured by the virtual camera so that the screen captured by the virtual camera is conformed to all reference locations.

At step 1540, the context-aware real-time spatial intelligence provision system receives the second video captured by the real camera. The second video may be identical to that of the first video received.

At step 1550, the context-aware real-time spatial intelligence provision system may analyze and extract 2D coordinates of objects from the second video and may place the corresponding objects in the virtual digital twin space model.

At step 1560, the context-aware real-time spatial intelligence provision system estimates the locations of the things corresponding to the objects extracted from the second video.

At step 1570, the context-aware real-time spatial intelligence provision system calculates the distance between two objects in the specific space.

At step 1580, when the persons located in a specific space and the calculated distance falls within a predetermined distance, the context-aware real-time spatial intelligence provision system may send a warning massage to persons in the specific space to keep social distancing.

At step 1590, the things may correspond to the body parts of a person in the specific space. In this case, the context-aware real-time spatial intelligence provision system may detect the posture change of a person by tracking all possible 3D locations of body parts and specifically the location of a head for the case of man-down situation.

The method according to an embodiment of the present invention may be implemented in the form of program instructions, and may be then recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

According to the foregoing embodiments, the distance between persons may be accurately estimated even with a single video camera.

According to the foregoing embodiments, the distance between persons may be estimated, and then a warning message may be sent to a person who does not keep social distancing.

According to the foregoing embodiments, the distance between persons may be kept, and thus the spread of infectious diseases such as COVID-19 may be prevented.

As described above, although the embodiments have been described in conjunction with the limited embodiments and the drawings, it will be apparent to those of ordinary skill in the art that various modifications and variations are possible based on the above description. For example, even when the above-described technology is performed in an order different from that of the described method, the components of the above-described system, structure, device, circuit, or the like are coupled or combined in a form different from that of the described method, or some of the components are replaced with other components or equivalent components, an appropriate result may be achieved.

Therefore, other implementations, other embodiments, and those equivalent to the claims also fall within the scope of the attached claims to be described later.

What is claimed is:

1. A context-aware real-time spatial intelligence provision system comprising:
    a video stream receiver unit configured to receive a video captured by a camera;
    a virtual digital twin space model management unit configured to generate and manage a virtual space obtained by simulating the specific space using a digital twin technique;
    a digital twin location management unit configured to estimate locations of things in the specific space corresponding to objects, extracted from the video, by comparing the video and the virtual space view;
    a distance calculation unit configured to calculate a distance between the things in the specific space based on the estimated locations; and
    a message sending unit configured to send a warning message to the things in the specific space, in response to the estimated distance falling within a predetermined distance,
    wherein the things are persons in the specific space.

2. The context-aware real-time spatial intelligence provision system of claim 1, wherein:
    the things are body parts of a person in the specific space; and
    the context-aware real-time spatial intelligence provision system further comprises a posture detection unit configured to detect a posture change of a person based on estimated 3D locations of body parts.

3. The context-aware real-time spatial intelligence provision system of claim 2, wherein the posture detection unit is further configured to estimate the posture of a person by:
    estimating a location of a joint including a foot of a person;
    estimating locations of other joints in ascending order of height from the foot; and
    estimating locations at which the other joints are likely to be located by taking into consideration a human body proportion or statistical body size.

4. The context-aware real-time spatial intelligence provision system of claim 1, wherein a location of a virtual camera viewing the virtual space is determined to correspond to a location of the camera within the specific space.

5. The context-aware real-time spatial intelligence provision system of claim 4, wherein an angle of view of the virtual camera is determined such that an angle of view in a case where virtual reference locations in the virtual space corresponding to a plurality of reference locations in the specific space are captured by the virtual camera is conformed to an angle of view at which the reference locations are captured in the video.

6. The context-aware real-time spatial intelligence provision system of claim 5, further comprising an angle of view adjustment unit configured to rotate the virtual screen so that a first reference location obtained by marking the first one of the plurality of reference locations on a video screen captured is conformed to the first virtual reference location obtained by marking the first virtual reference location in the virtual space corresponding to the first reference location on a virtual video screen captured by the virtual camera.

7. The context-aware real-time spatial intelligence provision system of claim 6, wherein the angle of view adjustment unit rotates the rotated virtual video screen again so that a second reference locations obtained by marking the second one of the plurality of reference locations on the captured video is conformed to the second virtual reference location obtained by marking a second virtual reference location in the virtual space corresponding to the second reference location on the virtual screen.

8. A context-aware real-time spatial intelligence provision method comprising:
   receiving an video stream captured by a surveillance camera;
   generating and managing a virtual space obtained by simulating the specific space using a digital twin technique;
   estimating locations of things in the specific space corresponding to objects, extracted from the captured video, by comparing the video and the virtual space;
   estimating a distance between the things in the specific space based on the estimated locations; and
   sending a warning message to the persons in the specific space, in response to the estimated distance falls within a predetermined distance,
   wherein the things are persons in the specific space.

9. The context-aware real-time spatial intelligence provision method of claim 8, wherein:
   the things are body parts of a person in the specific space; and
   the location estimation method further comprises estimating a posture of the person based on any one of locations and a pattern of the body parts.

10. The context-aware real-time spatial intelligence provision method of claim 9, wherein the estimating a posture of the person comprises estimating the posture of the person by:
   estimating a location of a joint including a foot of the person;
   estimating locations of other joints in ascending order of height from the foot; and
   estimating locations at which the other joints are likely to be located by taking into consideration a human body proportion or statistical body size.

11. The context-aware real-time spatial intelligence provision method of claim 8, wherein a location of a virtual camera viewing the virtual space is determined to correspond to a location of the camera within the specific space.

12. The context-aware real-time spatial intelligence provision method of claim 11, wherein an angle of view of the virtual camera is determined such that an angle of view in a case where virtual reference locations in the virtual space corresponding to a plurality of reference locations in the specific space are captured with the virtual camera is conformed to an angle of view at which the reference locations are captured in the video.

13. The context-aware real-time spatial intelligence provision method of claim 12, further comprising rotating the virtual image so that the first reference location captured by marking the first one of the plurality of reference locations on a video captured the specific space is conformed to the first virtual reference location obtained by marking the first virtual reference location in the virtual space corresponding to the first reference location on a virtual video captured the virtual space using the virtual camera.

14. The context-aware real-time spatial intelligence provision method of claim 13, further comprising rotating the rotated virtual image again so that a second reference location obtained by marking the second one of the plurality of reference locations on the captured video is conformed to the second virtual reference location obtained by marking a second reference location in the virtual space corresponding to the second reference location on the virtual video screen.

15. A non-transitory computer-readable storage medium storing instructions that, when executed by a processor, causes the processor to execute the method of claim 1.

* * * * *